United States Patent
Tajima et al.

(10) Patent No.: US 7,387,415 B2
(45) Date of Patent: Jun. 17, 2008

(54) VEHICLE HEADLAMP HAVING SYMMETRICAL ACTUATOR WITH FRONT CONNECTOR

(75) Inventors: Keiichi Tajima, Shizuoka (JP); Tsutomu Takiguchi, Shizuoka (JP); Kazuma Mochizuki, Shizuoka (JP); Naoki Takii, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 184 days.

(21) Appl. No.: 11/050,343

(22) Filed: Feb. 3, 2005

(65) Prior Publication Data

US 2005/0174786 A1   Aug. 11, 2005

(30) Foreign Application Priority Data

Feb. 6, 2004   (JP) .................... P. 2004-031040

(51) Int. Cl. *F21V 17/02* (2006.01)
(52) U.S. Cl. .................... 362/513; 362/467
(58) Field of Classification Search ........ 362/467, 362/513
See application file for complete search history.

(56) References Cited

U.S. PATENT DOCUMENTS

| | | | | |
|---|---|---|---|---|
| 3,117,302 A | * | 1/1964 | Cardarelli et al. | 362/35 |
| 4,663,696 A | * | 5/1987 | Miyazawa et al. | 362/514 |
| 6,000,816 A | * | 12/1999 | Serizawa et al. | 362/518 |
| 6,874,918 B2 | * | 4/2005 | Tawa et al. | 362/465 |
| 6,984,060 B2 | * | 1/2006 | Baba et al. | 362/467 |
| 7,036,964 B2 | * | 5/2006 | Takii et al. | 362/465 |
| 2002/0064051 A1 | * | 5/2002 | Sugimoto et al. | 362/467 |

FOREIGN PATENT DOCUMENTS

JP   2002-160581   6/2002

* cited by examiner

*Primary Examiner*—Ismael Negron
(74) *Attorney, Agent, or Firm*—Fish & Richardson P.C.

(57) ABSTRACT

A vehicular lamp has a lamp unit with a light source and controls light from the light source to obtain a predetermined light distribution, and an actuator that rotates the lamp unit using an output shaft to change a direction of illumination. A direction for drawing out an external cord that is connected to a connector, which is provided in the actuator for admitting electric power and/or a signal from outside, is set toward the vehicle front or vehicle side in the actuator.

2 Claims, 5 Drawing Sheets

VEHICLE HEADLAMP HAVING SYMMETRICAL ACTUATOR WITH FRONT CONNECTOR

RELATED APPLICATIONS

This claims the benefit of the priority of Japanese Application No. P.2004-31040, filed Feb. 6, 2004, which is hereby incorporated herein in its entirety.

TECHNICAL FIELD

The present disclosure relates to a new vehicular lamp. More specifically, the present disclosure relates to a way for reducing a depth dimension of a vehicular lamp.

BACKGROUND

Techniques are known for changing a lateral illumination direction of a vehicular lamp in accordance with a steering operation.

Such a vehicular lamp is shown, for example, in Japanese Patent Laid-Open Publication No. 2002-160581. There, a lamp unit with a configuration rotatable in a lateral direction is provided with a lamp body (3) and a light source bulb (23) supported by the lamp body (3). In addition, a rotation shaft (output shaft) (16) of a driving portion (actuator) is connected to the lamp body. The rotation shaft (16) is rotated by electric power and a signal supplied via an external cord connected to a connector, whereby the lamp body (3) is rotated in the lateral direction so as to change an illumination direction of light distribution thereof in the lateral direction.

However, in the vehicular lamp described there, the connector of the actuator (11) is disposed facing toward the rear; therefore, the external cord for supplying electric power and a signal from the outside to the actuator (11) is drawn out toward the rear.

Moreover, a cord (27) for supplying electric power to the light source bulb (23) is disposed so as to extend toward the rear of the lamp body (3). If the external cord for supplying electric power and the signal to the actuator (11) is also positioned toward the rear, a wide rear space inside the lamp thus becomes required, which increases the dimensions of a depth direction of the lamp. Moreover, high-voltage electric power is required when a discharge bulb is used in the light source bulb. This necessitates a thicker power cord for the light source bulb in order to supply high-voltage electric power and prevent electromagnetic radiation. Consequently, such a power cord has little flexibility, and moves considerably in the lateral direction in conjunction with rotation of the lamp body (3) in the lateral direction. A significantly large space is thus required in order to ensure that the external cord for supplying electric power and the signal to the actuator (11) is positioned in a rear portion of the lamp so as not to interfere with the movement of the power cord. This inevitably requires the lamp to have a large rear protrusion.

Due to increased function and performance, there is an extremely high density of parts and devices disposed in the space underneath the hoods of recent automobiles, and designers are forced to find increasingly innovative methods for efficiently placing each device and part. In light of such conditions, it is extremely difficult nowadays to secure a large space for the placement of a lamp in a front portion of an automobile, especially space in the depth direction.

The present disclosure was made in light of the foregoing circumstances.

SUMMARY

The present disclosure relates to drawing out an external cord that is connected to a connector, which is provided in the actuator for admitting electric power and/or a signal from outside, toward the front or the side of the vehicle in the actuator.

According to an embodiment of the present invention, there is no need to secure a space at the rear of internal space in the vehicular lamp to position the external cord, making it possible to reduce a dimension of the vehicular lamp in the depth direction.

A vehicular lamp has a lamp unit with a light source and controls light from the light source to obtain a predetermined light distribution. An actuator rotates the lamp unit using an output shaft to change a direction of illumination. A direction for drawing out an external cord that is connected to a connector, which is provided in the actuator for admitting electric power and/or a signal from outside, is set toward either the vehicle front or the vehicle side in the actuator.

According to an embodiment of the present invention, there is no need to secure a space at the rear of internal space in the vehicular lamp to position the external cord for supplying electric power and/or a signal to the actuator. Therefore, it is possible to reduce a dimension of the vehicular lamp in the depth direction.

In the invention according to another embodiment, the connector is provided on a front side of the actuator, and an outer shape of the actuator is symmetrical along a line that connects the output shaft and the connector. The actuator can therefore be used for both vehicular lamps mounted on the right and left sides of the vehicle, thus suppressing manufacturing costs.

In the invention according to still another embodiment, the lamp unit and the actuator are disposed inside a lamp chamber defined by a lamp body and a translucent cover that covers a front surface side of the lamp body, and an extension that covers a front of the connector and the external cord connected to the connector is disposed inside the lamp chamber. Therefore, the overall appearance of the vehicular lamp in a front view is not spoiled by exposure of the connector and the external cord.

In the invention according to a further embodiment, the light source is a discharge bulb to which electric power is supplied by a power cord extending from a bottom portion of the lamp chamber. There is thus no interference between the power cord to the discharge bulb and the external cord to the actuator, which assures that there is no leakage of high voltage due to interference.

Various other features and advantages may be readily apparent from the following detailed description, the accompanying drawings, and the claims.

DETAILED DESCRIPTION OF THE INVENTION

Figure 1:
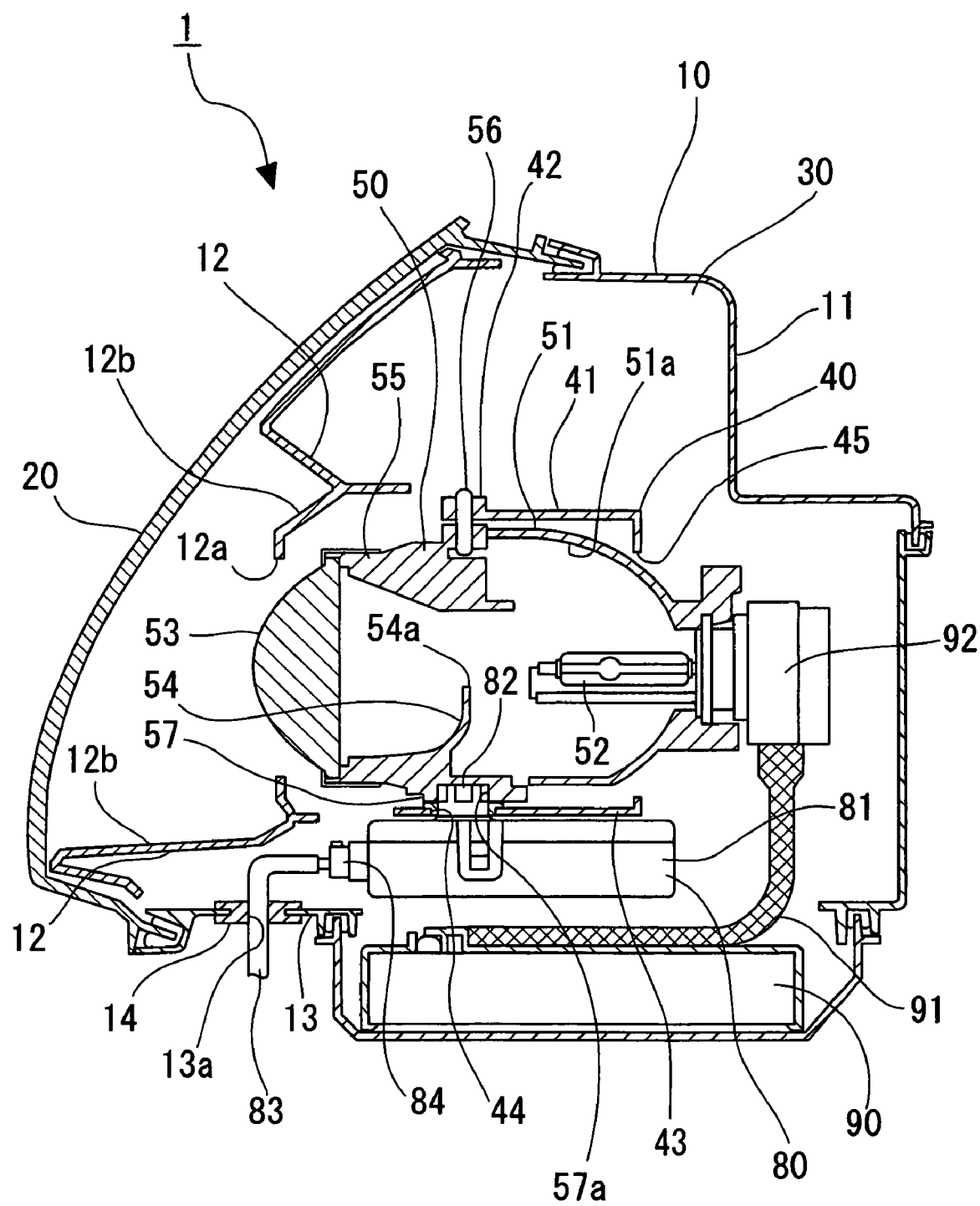
FIG. 1 shows a vehicular lamp according to an embodiment of the present invention, and is a longitudinal cross-sectional view thereof.
Figure 2:
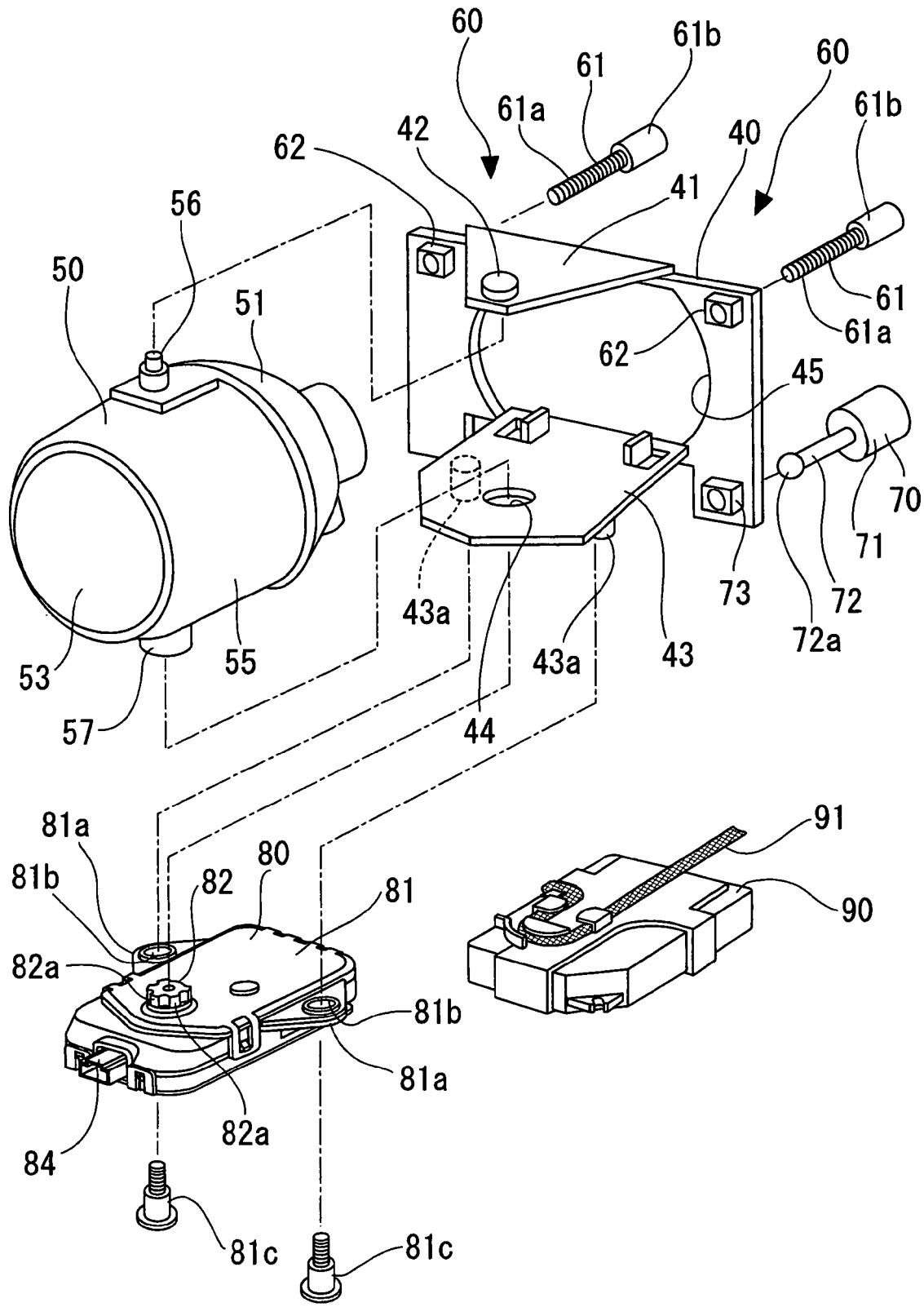
FIG. 2 is an exploded perspective view of a main portion of the embodiment of FIG. 1.

As is apparent in FIGS. 1 and 2, a vehicular headlamp 1 is provided with a lamp body 10 including a concave portion with an opening that faces forward, and the front opening of the lamp body 10 is covered by a translucent cover 20 to form a lamp chamber 30. A bracket 40 is disposed inside the lamp chamber 30, which is supported tiltable with respect to the lamp body 10, and a lamp unit 50 tiltable in the horizontal direction is supported by the bracket 40.

The lamp unit 50 has a reflector 51, light source bulb 52 supported by the reflector 51, a light projection lens 53 provided so as to cover a front of the reflector 51, and a shade 54 to limit an upper edge of a pattern of radiated light (light distribution pattern). The reflector 51 has a reflective surface 51a with a light condensing property. The light projection lens 53 has a convex lens shape and is supported on an end portion of an assembly frame 55, which has a generally cylindrical shape and is fixed to a front end portion of the reflector 51.

Light radiating from the light source bulb 52 and reflected by the reflective surface 51a of the reflector 51 is condensed in the vicinity of an upper edge 54a of the shade 54. In addition, a focal point of the light projection lens 53 is positioned in the vicinity of the upper edge 54a of the shade 54. Accordingly, a beam with an upper edge of a light distribution pattern thereof limited by the upper edge 54a of the shade 54 is radiated forward by the light projection lens 53.

A fulcrum shaft 56 protrudes upward from a top surface of a rear end portion of the assembly frame 55. Likewise, a connecting boss 57 protrudes downward from a bottom surface of the rear end portion. A connecting concave portion 57a is formed opening downward on the connecting boss 57. It should be noted that the center of the connecting concave portion 57a and the center of the fulcrum shaft 56 are positioned on the same axis.

In the lamp unit 50, the fulcrum shaft 56 is rotatably supported on a shaft-supporting portion 42 provided on a front end portion of a mounting part 41, which is on a top side of the bracket 40. The connecting boss 57 is inserted to penetrate toward a bottom side of an insertion hole 44 provided in a front end portion of a mounting part 43, which is on a bottom side of the bracket 40. Furthermore, a rear end portion of the lamp unit 50 protrudes toward the rear from a large opening 45 provided in the bracket 40.

As is clearly apparent in FIG. 2, an upper portion of the bracket 40 is supported by pivot fulcrum portions 60, 60 at two points spaced apart in the horizontal direction; and a lower portion is supported via a leveling actuator 70.

The pivot fulcrum portion 60 is constructed from a nut body 62 that is supported by the bracket 40 and an adjustment shaft 61 rotatably supported on a rear surface wall 11 of the lamp body 10. The adjustment shaft 61 has a head portion 61b fixedly formed with a rear end of a screw shaft portion 61a, wherein the head portion 61b protrudes toward a rear side of the rear surface wall 11 of the lamp body 10, and the adjustment shaft 61 can be rotated by operating the head portion 61b. The nut body 62 is supported in a state capable of moving somewhat so as to tilt with respect to the bracket 40, and the screw shaft portion 61a of the adjustment shaft 61 is screwed into the nut body 62. Accordingly, operating the adjustment shaft 61 by rotation will screw or unscrew the screw shaft portion 61a into or out of the nut body 62 depending on the direction of rotation. Therefore, the space can be varied between the rear surface wall 11 of the lamp body 10 and the portion supporting the nut body 62 of the bracket 40. Note that the pivot fulcrum portion 60 shown is configured so as to have an adjustable space between the bracket 40 and the rear surface wall 11 of the lamp body 10; however, it may also be configured such that the space between the bracket 40 and the lamp body 10 is not adjustable.

The leveling actuator 70 has a configuration in which a sliding shaft 72 protrudes from a front end of a housing 71 with a driving mechanism provided therein. A sphere 72a is formed on a front end of the sliding shaft 72. Driving of the driving mechanism within the housing 71 moves the sliding shaft 72 in the longitudinal direction with respect to the housing 71. In addition, the driving mechanism within the housing 71 is designed to drive as appropriate according to an automatic control based upon remote operation from the driver's cab, or output from a sensor that detects tilting in a vehicular longitudinal direction or the like. A globe acceptor 73 is supported at a position below a position supporting one of the nut bodies 62, 62 among the bottom end portions of the bracket 40. The sphere 72a on the front end of the sliding shaft 72 engages in a rotatable state with a spherical concave portion (not shown) of the sphere acceptor 73. Furthermore, the leveling actuator 70 is fixedly supported by the lamp body 10. Accordingly, driving of the leveling actuator 70 moves a portion supporting the sphere acceptor 73 in the bottom end portion of the bracket 40 in the longitudinal direction with respect to the lamp body 10. Consequently, the bracket 40 is rotated in the up-down direction around a rotation axis consisting of a line connecting the nut bodies 62, 62 of the pivot fulcrum portions 60, 60.

The mounting parts 41, 43 of the bracket 40 mentioned above protrude forward from both the top and bottom edges of the large opening 45 with a generally oblong shape. In addition, attachment bosses 43a, 43a protrude from a bottom surface of the mounting part 43 on the bottom side.

The lamp unit 50 is rotated in the lateral direction by a swivel actuator 80 that is supported by the mounting part 43 on the bottom side of the bracket 40.

Figure 3:
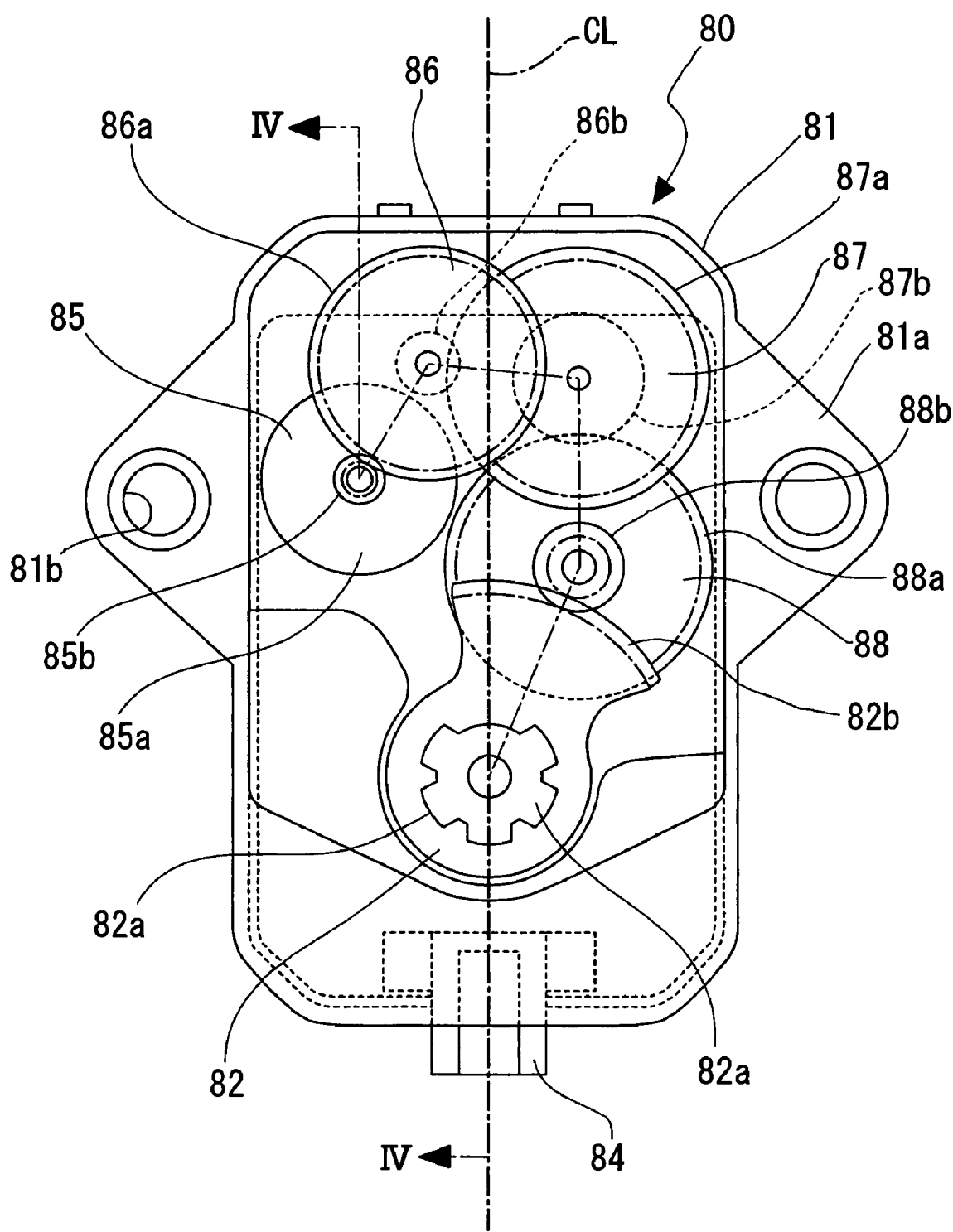
FIG. 3 is a plane view of an internal structure of an actuator.
Figure 4:
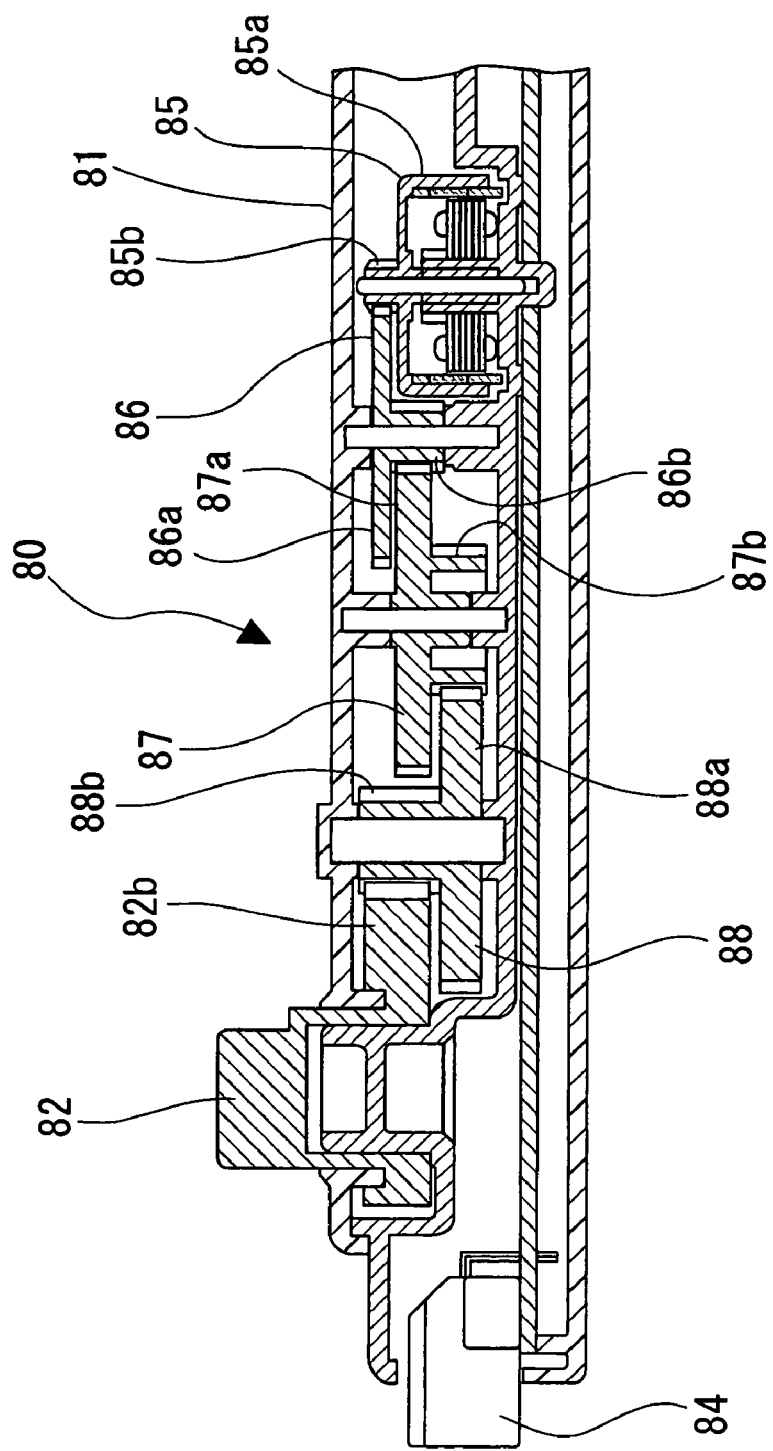
FIG. 4 is a cross-sectional view taken along a line IV-IV in FIG. 3.

As apparent in FIGS. 2 to 4, the swivel actuator 80 has a configuration where an output shaft 82 protrudes upward from a position on a front end of a housing 81, an outer shape of which is somewhat long in the longitudinal direction and flat in the vertical direction.

The housing 81 has two attachment parts 81a, 81a that protrude toward the sides. Furthermore, attachment screws 81c, 81c inserted from below into insertion holes 81b, 81b of the attachment parts 81a, 81a are screwed into the attachment bosses 43a, 43a provided protruding from the bottom surface of the mounting part 43 on the bottom side of the bracket 40. Thus, the swivel actuator 80 is fixed to the bottom surface of the mounting part 43 on the bottom side of the bracket 40.

On an outer peripheral surface of an upper end portion of the output shaft 82, a plurality of engagement projections 82a, 82a, . . . are provided so as to protrude extending in an axial direction. By internally engaging the upper end portion of the output shaft 82 with a connecting concave portion 57a of the lamp unit 50, the engagement projections 82a, 82a, . . . of the output shaft 82 become engaged with engagement grooves (not shown) formed on an inner peripheral surface of the connecting concave portion 57a. Slipping between the output shaft 82 and the connecting concave portion 57a in the rotational direction is thus prevented, and the rotation of the output shaft 82 is securely transmitted to the lamp unit 50.

A connector 84 for connecting an external cord 83, which supplies electric power and a signal to a driving mechanism inside the housing 81, is positioned in a state facing forward at a center of the front end portion of the housing 81 in the lateral direction. Accordingly, as apparent in FIG. 1, the external cord 83 connected to the connector 84 is positioned so as to be drawn out forward from a front end portion of the swivel actuator 80. Furthermore, the external cord 83 is drawn outside of the lamp from an insertion hole 13a formed in a bottom surface wall 13 of the lamp body 10. It should be noted that a reference numeral 14 denotes a rubber bushing mounted to the insertion hole 13a. In addition, the insertion hole 13a may also be provided at a position offset in the vehicular width direction.

As is apparent in FIG. 1, an extension 12 is disposed on the front end portion inside the lamp chamber 30. The extension 12 is disposed so as to be positioned at a portion between the front end portion of the lamp unit 50 and the front opening edge of the lamp body 10, and is provided with an opening 12a that faces forward a portion excluding a peripheral edge of the light projection lens 53 of the lamp unit 50. A front surface 12b is a visible surface with an excellent appearance. Therefore, although the connector 84 is positioned on the front end of the swivel actuator 80, and the external cord 83 connected to the connector 84 is drawn out forward, the external cord 83 and the front end portion of the swivel actuator 80 are completely blocked in front by the extension 12. Accordingly, the appearance of the vehicular headlamp 1 is not spoiled, because the external cord 83 and the swivel actuator 80 are not seen through the translucent cover 20.

As is clearly apparent in FIGS. 3 and 4, a brushless motor 85 is disposed as a driving source inside the housing 81, and the rotation of the brushless motor 85 is transferred to the output shaft 82 via a transfer gear system. Namely, a sector gear 82b is fixedly formed on the output shaft 82, and the rotation of the motor 85 is transferred to the sector gear 82b via three transfer gears 86, 87, 88, thereby rotating the output shaft 82 fixed with the sector gear 82b. The respective transfer gears 86, 87, 88 have large gears 86a, 87a, 88a and small gears 86b, 87b, 88b fixedly formed on like axes. The large gear 86a of the transfer gear 86 engages with a pinion gear 85b fixedly formed with a rotor 85a of the motor 85; the small gear 86b of the transfer gear 86a engages with the large gear 87a of the transfer gear 87; the small gear 87b of the transfer gear 87 engages with the large gear 88a of the transfer gear 88; and the small gear 88b of the transfer gear 88 engages with the sector gear 82b.

As is apparent in FIGS. 2 and 3, the outer shape of the swivel actuator 80 is symmetrical along an extending line CL that connects the output shaft 82 and the connector 84. Normally, headlamps for automobiles have different shapes for those disposed on the right side and those disposed on the left side of the automobile. In other words, a right-side headlamp has a shape symmetrical to the left-side headlamp. Accordingly, parts and members used for the left-side headlamp and parts and members used for the right-side headlamp are normally exclusive to each other. However, the swivel actuator 80 has an outer shape that is symmetrical, thus allowing it to be used for both the left-side headlamp and the right-side headlamp. Therefore, manufacturing costs can be kept lower than in the case of preparing separate actuators for the right and left sides.

A discharge bulb is used in the light source bulb 52 of the lamp unit 50. Therefore, a lighting circuit unit 90 with a lighting circuit for lighting a discharge bulb 52 is disposed in a bottom portion inside the lamp body 10. An end of a power cord 91 extending from the lighting circuit unit 90 is connected to a bulb socket 92, and the bulb socket 92 is connected to the light source bulb 52. Accordingly, lighting voltage generated by the lighting circuit provided inside the lighting circuit unit 90 is applied to the light source bulb 52 via the bulb socket 92, thereby lighting the light source bulb 52. Since high-voltage electric power is required to light the discharge bulb, this necessitates a thicker power cord 91 for the light source bulb 52 in order to supply high-voltage electric power and prevent electromagnetic radiation, as well as requiring a metallic (mesh) coating for preventing electromagnetic radiation. Consequently, such a power cord 91 has little flexibility, and moves considerably in the lateral direction of the rear portion of the lamp chamber 30 in conjunction with rotation of the lamp unit 50 in the lateral direction. In addition, the external cord 83 for supplying electric power and a signal to the swivel actuator 80 is not positioned in the rear portion of the lamp chamber 30, which has space for movement of such a power cord 91. Therefore, only space for the movement of the power cord 91 need be secured in the rear portion of the lamp chamber 30, thus allowing for a smaller amount of protrusion of the lamp body 10 toward the rear. In other words, it is possible to reduce a dimension of the vehicular headlamp 1 in the depth direction.

Figure 5:
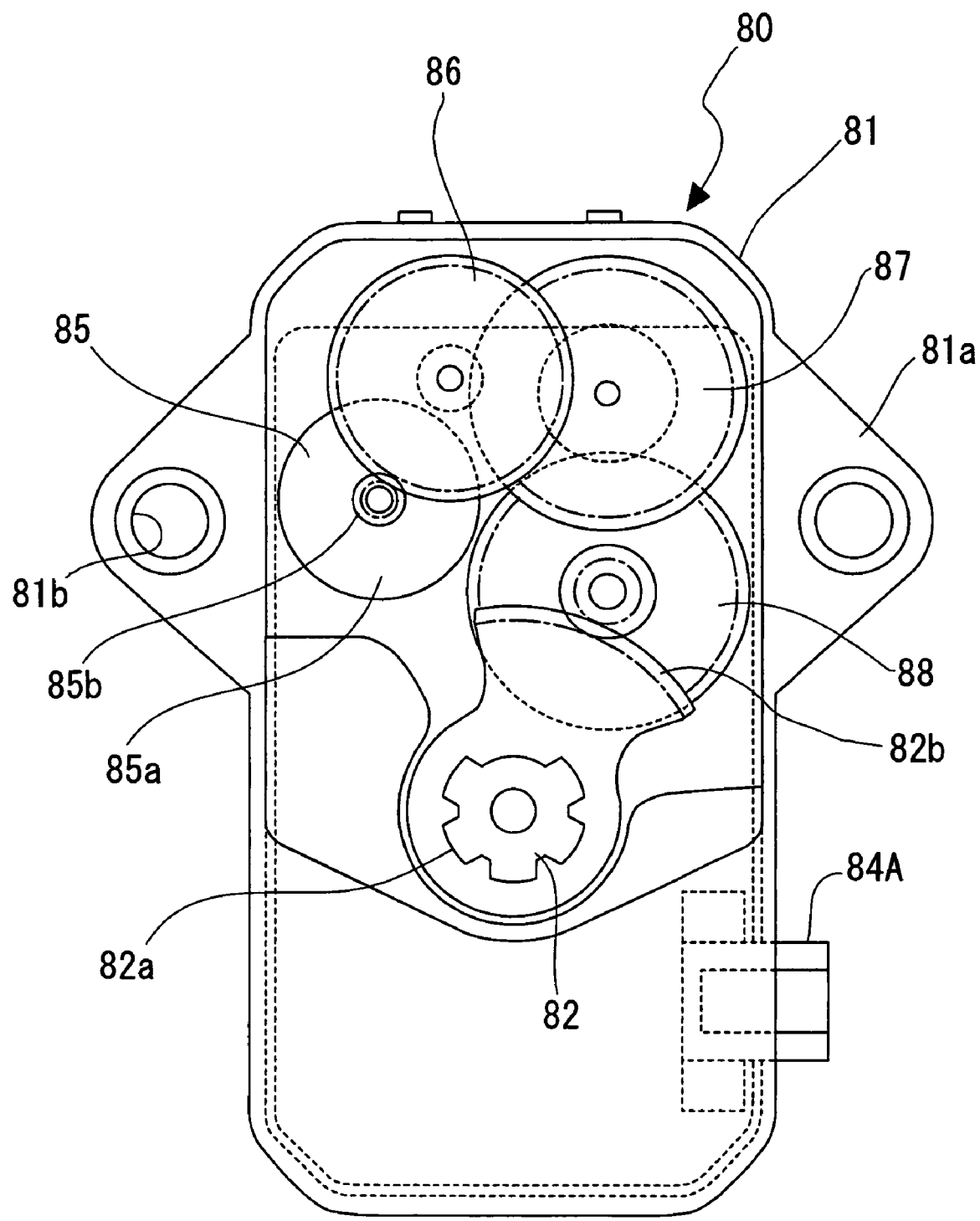
FIG. 5 is a plane view of an internal structure of an actuator showing a modification.

Furthermore, the external cord 83 and the power cord 91 do not interfere with each other upon rotation of the lamp unit 50, thus assuring that there is no leakage of high voltage due to contact between the external cord 83 and the power cord 91. It should be noted that disposing a connector 84A facing toward the side is also effective for avoiding interference between the external cord 83 and the power cord 91 as shown in FIG. 5.

Note that the shapes and structures of each portion shown in the above embodiment are but one specific example for carrying out the present invention, and must not be construed as limiting a technical scope of the present invention.

The present invention is suitable for application to a vehicular lamp that has an internal actuator and which requires a compact size, especially in the depth direction.

Other implementations are within the scope of the following claims.

What is claimed is:

1. A vehicle lamp comprising:
a lamp chamber;
a lamp unit disposed in the lamp chamber, the lamp unit having a light source comprising a discharge bulb, wherein the vehicle lamp is capable of controlling light from the light source to obtain a predetermined light distribution,
an actuator disposed in the lamp chamber, the actuator adapted to rotate the lamp unit using an output shaft to change a direction of illumination, wherein the output shaft protrudes upward from the actuator, and
a power cord to supply electric power to the discharge bulb, the power cord extending from a bottom portion of the lamp chamber,
wherein the actuator has a connector which is disposed on a front side of the actuator in a space that is forward and downward with respect to the output shaft, wherein an external cord is connected to the actuator for admitting at least one of electric power and a signal from outside, the external cord being drawn out in a direction toward either a vehicle front or a vehicle side, and wherein an outer shape of the actuator is symmetrical along a line that connects the output shaft and the connector, wherein the connector is arranged forward of the output shaft, and wherein a motor and a transfer gear system are arranged rearward of the output shaft.

2. The vehicle lamp according to claim 1, wherein the lamp chamber is defined by a lamp body and a translucent cover that covers a front surface side of the lamp body, and
an extension disposed inside the lamp chamber and covering a front of the connector and a portion of the external cord connected to the connector.

* * * * *